United States Patent
Fänger et al.

[11] Patent Number: 5,831,222
[45] Date of Patent: Nov. 3, 1998

[54] MEASURING DEVICE HAVING A LOAD MEASURING ELEMENT

[75] Inventors: Alfred Fänger, Wetter; Udo Gersemsky, Herdecke; Karl Zacharias, Schwerte, all of Germany

[73] Assignee: Mannesmann Aktiengesellschaft, Düsseldorf, Germany

[21] Appl. No.: 806,923

[22] Filed: Feb. 26, 1997

[30]  Foreign Application Priority Data

Mar. 8, 1996 [DE] Germany .............. 196 10 662.1

[51] Int. Cl.⁶ .................. G01G 3/08; B66C 1/40
[52] U.S. Cl. ............ 177/147; 177/229; 177/DIG. 9; 73/862.56
[58] Field of Search ................... 177/147, 229, 177/DIG. 9; 73/862.56

[56]  References Cited

U.S. PATENT DOCUMENTS

| | | | |
|---|---|---|---|
| 3,911,737 | 10/1975 | Ormond ............. | 73/141 A |
| 4,112,750 | 9/1978 | Murakami ............. | 177/147 |
| 4,455,880 | 6/1984 | Näslund ............. | 73/862.56 |
| 4,503,921 | 3/1985 | Polen et al. ............. | 177/147 |

FOREIGN PATENT DOCUMENTS 2913409 10/1980 Germany .
8622981 1/1987 Germany .
3938985 3/1991 Germany .

*Primary Examiner*—Michael L. Gellner
*Assistant Examiner*—Randy W. Gibson
*Attorney, Agent, or Firm*—Cohen, Pontani, Lieberman & Pavane

[57]  ABSTRACT

A measuring device including a substantially horizontal shaft having a longitudinal axis and a groove defined transverse thereto. The shaft is mounted with clearance in a substantially non-circular opening defined in the lateral supports of a supporting device, the clearance being provided at least in an area opposite the groove. A bearing pin is secured to the supporting device and partially engages the groove defined in the shaft, thereby axially and non-rotatably securing the shaft to the supporting device. A load measuring element is fixedly mounted to the supporting device and supports the end of the shaft longitudinally opposite the location of the groove. The load measuring element is preferably provided with wire strain gauges or microswitches, which permit simple measurement of the load. A pulley is rotatably supported by an annular pivot bearing for rotation about the shaft to transfer the load from the shaft to the bearing pin and load measuring element. Lateral support is provided to the supporting device by support plates which are attached by a spacer at their lower ends.

9 Claims, 3 Drawing Sheets

MEASURING DEVICE HAVING A LOAD MEASURING ELEMENT

BACKGROUND OF THE INVENTION

1. Field of the Invention

The present invention relates to a measuring device and in particular, to a measuring device having a load measuring element for a cable-pulley support of an upper block of a hoisting apparatus.

2. Description of the Related Art

A measuring device having a load measuring element for the upper block of a hoisting apparatus is disclosed in the 1995/1996 Component Manual of Mannesmann Demag Fördertechnik AG of Germany. This measuring device has a shaft on which a freely rotating cable pulley is supported. The ends of the shaft are fixedly supported axially in a supporting device on one end via a radial joint bearing and on the other end via the load measuring element, which is fastened by suitable fastening elements to the supporting device. The load acting on the cable pulley are borne by the shaft and distributed equally over the load measuring element and the radial joint bearing. The radial joint bearing used with this measuring device is disadvantageously expensive and consumes a relatively large amount of space. In addition, the radial joint bearing disclosed in this reference must be secured in an axial direction, resulting in additional assembly expense. Furthermore, the shaft cannot be secured against rotation when a radial joint bearing is employed because the shaft rotates with the cable pulley. Consequently, the load measuring element may be damaged when it contacts the shaft of the cable pulley.

SUMMARY OF THE INVENTION

It is accordingly an object of the present invention to provide a measuring device having a load measuring element for a cable-pulley support of an upper block of a hoisting apparatus and including a non-rotatable, axially affixable shaft.

The measuring device of the present invention comprises a substantially horizontal shaft having a longitudinal axis and a groove defined transverse thereto. The shaft is mounted with clearance in a substantially non-circular opening defined in the lateral supports of a supporting device, the clearance being provided at least in an area opposite the groove.

A bearing pin is secured to the supporting device and partially engages the groove defined in the shaft, thereby axially and non-rotatably securing the shaft to the supporting device. The bearing pin of the present invention performs two functions—it forms the swing bearing point of the measuring device and at the same time secures the shaft in the axial direction.

A load measuring element is fixedly mounted to the supporting device and supports the end of the shaft longitudinally opposite the location of the groove. The load measuring element is preferably provided with wire strain gauges or microswitches, which permit simple measurement of the load.

A pulley is rotatably supported by an annular pivot bearing for rotation about the shaft to transfer the load from the shaft to the bearing pin and load measuring element. Lateral support is provided to the supporting device by support plates which are attached by a spacer at their lower ends.

In this manner, a measuring device is configured with an inexpensive bearing which is easily secured in two directions—axially and against rotation. As a result, rotation of the shaft along with the rotating pulley is no longer possible. In addition, a bearing of this type requires a relatively small amount of space.

To adapt to different load directions, the supporting device is mounted in a support frame and swingable on a swing shaft at right angles to the shaft.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
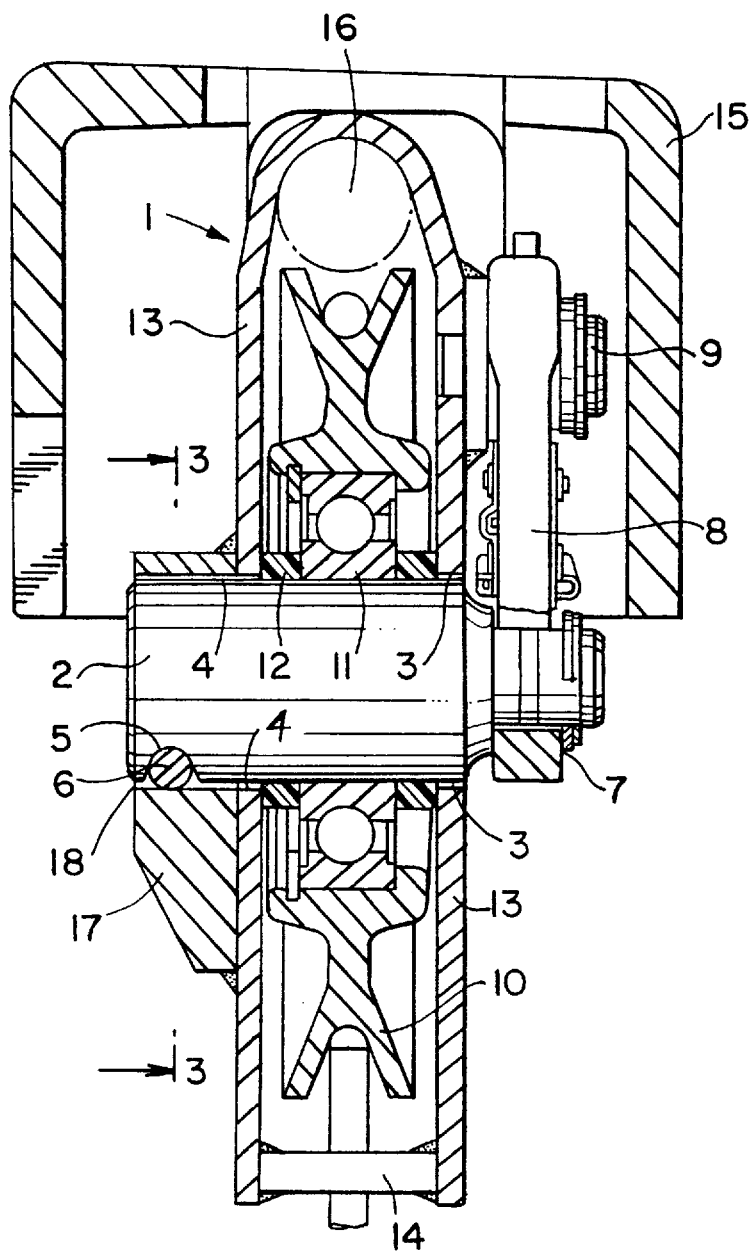
FIG. 1 is a cross-sectional view of a measuring device of an upper block having a load measuring element and configured according to the present invention.

Referring now to the drawings, and in particular, to FIG. 1, a measuring device having a load measuring element for a cable-pulley support of an upper block of a hoisting gear is shown. The measuring device includes a supporting device 1 mounted in a support frame 15 for pivotal movement about a swing shaft 16. The supporting device 1 is braced by lateral supports 13 having openings 3, 4 defined therein. A reinforcing element 17 is fastened laterally to the supporting device 1 to reinforce the opening 4 in the lateral supports 13. In a preferred embodiment, the openings 3, 4 are substantially elliptical. To keep the flexural stress of the measuring device low, the lateral supports 13 are attached to each other by a spacer 14—as a result of which the lateral supports 13 may be very thin.

A shaft 2 having a longitudinal axis and a groove 5 defined transverse thereto is horizontally disposed within the supporting device 1. The opposite ends of the shaft 2 pass through and are supported by openings 3, 4 defined in lateral supports 13. A clearance 18 is defined between the peripheral surface of the shaft 2 and the opening 4 of the lateral support 13—at least in an area opposite the groove 5. The clearance 18 allows the shaft 2 to rock about its longitudinal axis.

Figure 3:
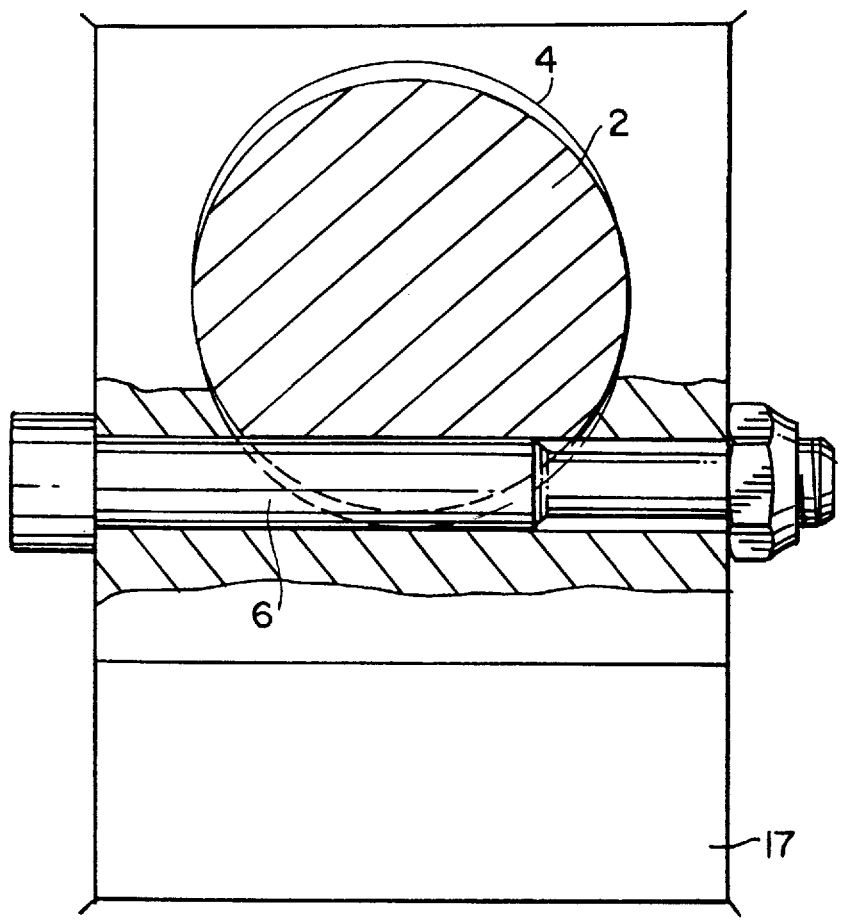
FIG. 3 is a partial cross-sectional view of the bearing pin of the present invention taken along the line A—A of FIG. 1.

A bearing pin 6 is secured to the supporting device 1 and passes through and partially engages the groove 5. The bearing pin 6 and groove 5 thereby secure the shaft 2 axially and against rotation. In a preferred embodiment, and as shown more clearly in FIG. 3, the bearing pin 6 comprises a round-head screw which is secured to the supporting device 1. FIG. 3 also illustrates the clearance 18 defined by the shaft 2 and opening 4 of the lateral support 13. In the preferred embodiment shown in FIG. 3, the openings 3, 4 are generally elliptical while the cross-section of the shaft 2 is generally circular. When configured thusly, the horizontal width of the opening 4 corresponds approximately to the diameter of the shaft 2. It will be obvious to one skilled in the art that the opening 4 may also comprise a generally circular cross-section while still providing a clearance 18 with the shaft 2.

Referring again to FIG. 1, the groove 5 is arranged at a right angle to the longitudinal axis of the shaft 2 and has a depth that is equal to the diameter of the bearing pin 6 minus the amount of clearance 18. It is thereby possible for the shaft 2 to rock at a small angle about the bearing pin 6.

A pulley 10 is rotatably supported on the shaft 2 by an annular pivot bearing 11 to transmit and distribute the load from the shaft 2. Elastic support rings 12 hold the annular pivot bearing 11 axially on the shaft 2.

A load measuring element 8 defines an opening 7 at one end and is fastened to the supporting device 1 at an end opposite thereto. In a preferred embodiment, the load measuring element 8 is fastened to a cylinder 9 which is fastened to the supporting device 1. The end of the shaft 2 opposite the groove 5 passes through and is supported by the opening 7 defined in the load measuring element 8. In a preferred embodiment, the load measuring element 8 includes wire strain gauges or microswitches, either of which permit the simple measurement of a load.

Figure 2:
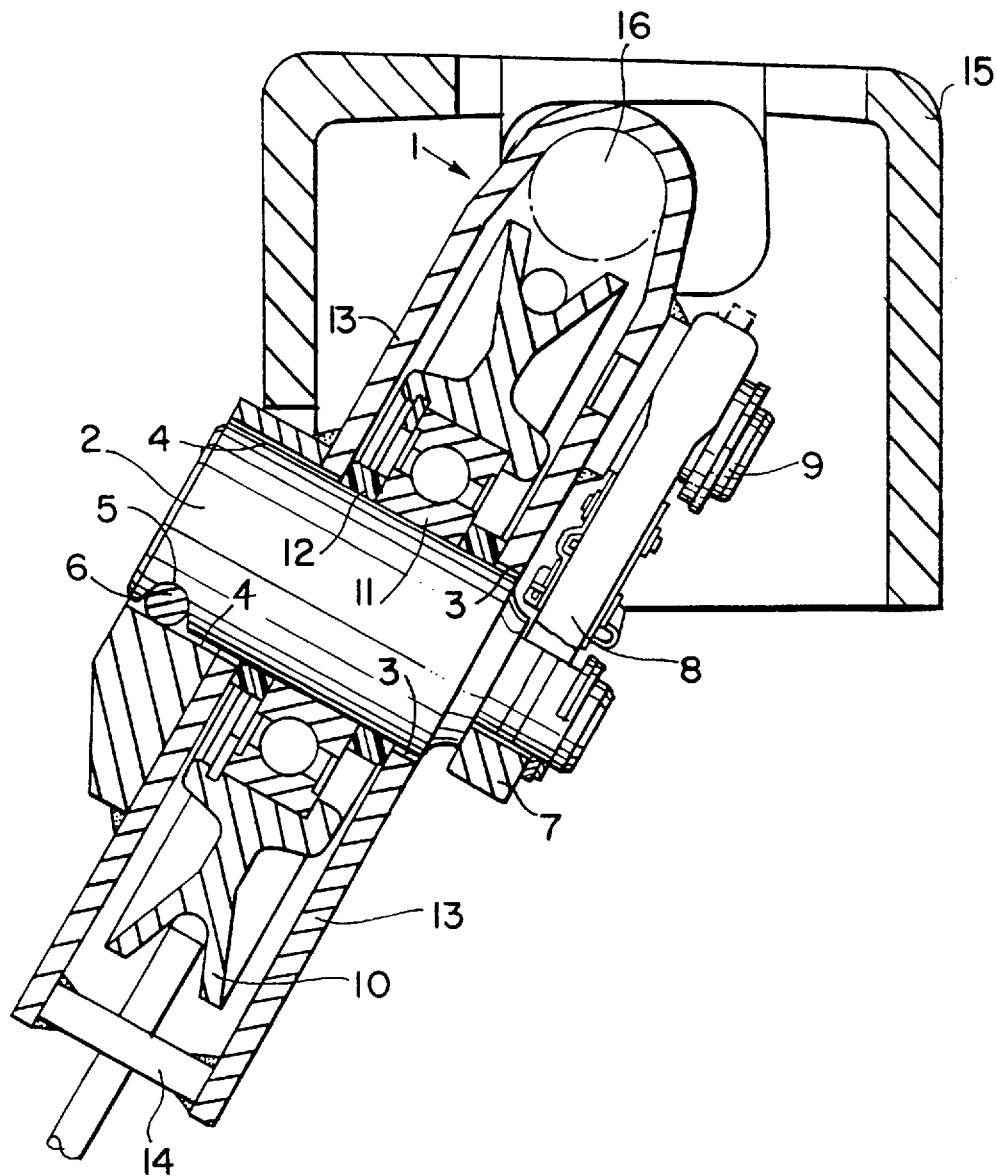
FIG. 2 is a view of the measuring device of FIG. 1, swung 30°.

As shown more clearly in FIG. 2, the supporting device 1 is mounted on a swing shaft 16 in the support frame 15 for swinging displacement of the supporting device 1 along an axis disposed at a right angle to the shaft 2. The swing shaft 16 permits the load measuring element 8 and shaft 2 to remain substantially perpendicular with respect to each other thereby providing a relatively constant dynamic load measurement. The supporting device 1 is thereby adaptable to loads from different and varying directions. As illustrated in FIG. 2, and by way of non-limiting example, the measuring device of the present invention may be swung at an angle of 30° with respect to the support frame 15.

In operation, a load is attached to a cable or other similar device which is threaded around the pulley 10. The load may be disposed perpendicular to the resting position of the measuring device, as illustrated in FIG. 1, or the load may be disposed at some angle away from the position shown in FIG. 1, such as, for example, shown in FIG. 2. In either instance, the load is transmitted and distributed by the shaft 2 and is measured by the load measuring element 8. The non-rotatable and axially secured shaft 2, in conjunction with the annular pivot bearing 11 and pulley 10, permit dynamic load measurement without the possibility that the load measuring element 8 will be damaged by rotation of the pulley 10. Use of a round-head screw as the bearing pin 6 produces an inexpensive and compact measuring device suitable for dynamically measuring loads at varying and different angles.

The invention is not limited by the embodiments described above which are presented as examples only but can be modified in various ways within the scope of protection defined by the appended patent claims.

What is claimed is:

1. A measuring device having a load measuring element for a cable-pulley support of an upper block of a hoisting gear, comprising:

a supporting device having a plurality of openings defined therein;

a bearing disposed in one of said plurality of openings in said supporting device;

a load measuring element disposed adjacent one of said plurality of openings in said supporting device; and a shaft having a longitudinal axis and a groove defined transverse thereto, said shaft being supported in two of said plurality of openings in said supporting device, said shaft being axially affixed to said supporting device on one end by said bearing and on an end opposite thereto, by said load measuring element, wherein a clearance is defined between said shaft and at least one of said plurality of openings opposite said groove;

wherein said bearing further comprises a bearing pin fastened to said supporting device, said bearing pin partially engaging said groove to limit the axial and rotational movement of said shaft.

2. The measuring device as defined in claim 1, wherein said supporting device further comprises:

a plurality of lateral supports for support of said supporting device; and a spacer attached between said plurality of lateral supports for limiting the flexural stress thereof.

3. The measuring device as defined in claim 1, wherein said plurality of openings defined in said supporting device are substantially elliptical and wherein the horizontal width of said plurality of openings corresponds approximately to the diameter of said shaft.

4. The measuring device as defined in claim 1, further comprising:

an annular pivot bearing mounted on said shaft; and a pulley rotatably supported by said pivot bearing.

5. The measuring device as defined in claim 4, further comprising a plurality of elastic support rings for axially securing said annular pivot bearing on said shaft.

6. The measuring device as defined in claim 1, wherein said groove is disposed at a right angle to said shaft longitudinal axis.

7. The measuring device as defined in claim 1, wherein said bearing pin comprises a round-headed screw which is threadedly affixed to said supporting device.

8. The measuring device as defined in claim 1, further comprising a support frame, said supporting device being mounted to said support frame for movement substantially perpendicular to said shaft longitudinal axis.

9. The measuring device as defined in claim 1, wherein said load measuring element is selected from a group consisting of wire strain gauges and microswitches.

* * * * *